(12) United States Patent
Chan

(10) Patent No.: US 6,349,386 B1
(45) Date of Patent: Feb. 19, 2002

(54) LAUNCH KEY, LOW POWER CD-ROM PLAYER FOR PORTABLE COMPUTERS

(75) Inventor: Reginia Chan, Los Altos, CA (US)

(73) Assignee: 02 Micro International Limited, Grand Cayman (KY)

( * ) Notice: Subject to any disclaimer, the term of this patent is extended or adjusted under 35 U.S.C. 154(b) by 0 days.

(21) Appl. No.: 09/643,506

(22) Filed: Aug. 22, 2000

Related U.S. Application Data

(60) Provisional application No. 60/150,516, filed on Aug. 24, 1999.

(51) Int. Cl.[7] .............................. G06F 1/26; G06F 1/28; G06F 1/30
(52) U.S. Cl. ........................... 713/323; 713/320; 713/1; 713/2; 713/200
(58) Field of Search ................................ 713/300–340, 713/1, 2, 200

(56) References Cited

U.S. PATENT DOCUMENTS

| | | | |
|---|---|---|---|
| 5,548,777 A | 8/1996 | Woo ........................... 395/821 |
| 5,619,402 A | 4/1997 | Liu ............................. 363/20 |
| 5,642,417 A * | 6/1997 | Stringer ........................ 380/4 |
| 5,671,368 A | 9/1997 | Chan et al. ................. 395/282 |
| 5,696,975 A * | 12/1997 | Moore et al. ................. 395/712 |
| 5,732,266 A * | 3/1998 | Moore et al. .................. 713/1 |
| 5,796,705 A | 8/1998 | Kim ........................... 369/124 |
| 5,835,759 A * | 11/1998 | Moore et al. .................. 713/1 |
| 5,870,355 A | 2/1999 | Fujihara ...................... 369/32 |
| 5,903,764 A | 5/1999 | Shyr et al. ............. 395/750.01 |
| 5,910,933 A | 6/1999 | Moore ......................... 369/33 |
| 5,974,549 A * | 10/1999 | Golan ......................... 713/200 |
| 6,006,285 A | 12/1999 | Jacobs et al. ................. 710/14 |
| 6,047,380 A | 4/2000 | Nolan et al. ................. 713/324 |
| 6,125,417 A | 9/2000 | Bailis et al. ................. 710/103 |
| 6,202,121 B1 * | 3/2001 | Walsh et al. ................. 711/100 |
| 6,226,237 B1 * | 5/2001 | Chan et al. .................... 369/33 |

\* cited by examiner

Primary Examiner—Rupal Dharia
(74) Attorney, Agent, or Firm—Hayes, Soloway, Hennessey, Grossman & Hage, P.C.

(57) ABSTRACT

A portable computer adapted with an application launch controller to selectively launch a desired application when the portable computer is in an off or suspended state. Programmable function keys are provided to permit users to define associated applications with the function keys to initiate launching of the application. The application launch controller includes bus interface circuitry to interface with system busses, for example, ISA bus and SMBus technology to exchange commands and data therewith. In the preferred embodiments, the application launch controller displays results of the desired application to an LCD display rather than the main system display to preserve power.

14 Claims, 4 Drawing Sheets

LAUNCH KEY, LOW POWER CD-ROM PLAYER FOR PORTABLE COMPUTERS

The application claims benefit of Provisional Application No. 60/150,516 filed Aug. 24, 1999.

BACKGROUND OF THE INVENTION

1. Field of the Invention

The present invention relates to a controller for portable computers to launch applications. More specifically, the present invention relates to a portable computer adapted with a controller to launch applications when the main components of the system are in off or suspend mode.

2. Description of Related Art

In traditional digital computers such as portable lap top or notebook personal computers, the computer needs to be fully operating to monitor/accept the functionality associated with a preprogrammed function key for launching a specific software application. However, continuous power to the system likewise continuously drains battery power, especially in portable computers. Traditionally, applications are launched from within the operating system only when power to the system is on. The present invention provides an alternative mode for powering on the system to launch a specific application, preset by a user.

In U.S. patent application Ser. No. 09/136,207 entitled "Low Power CD-ROM Player for Portable Computers" filed Aug. 19, 1998, now U.S. Pat. No. 6,226,237 (herein incorporated by reference), it is disclosed a CD-ROM subsystem for a digital computer. The CD-ROM subsystem includes a CD-ROM drive, CD-ROM control buttons (i.e., function keys) for controlling a CD-ROM drive's operation, and an audio interface controller to permit users to operate the CD-ROM without having to fully power the main components of the computer system. The present invention augments the functionality disclosed in the aforementioned patent application by adding a mode switch enabling users to launch a specific application when the computer is either off or in a suspend state.

SUMMARY OF THE INVENTION

Accordingly, it is a main object of the present invention to adapt laptop and notebook digital computers with an application controller to permit users to activate a computer system and launch an application when the system is in an off or standby state.

The present invention provides a computer system adapted to launch application when the computer system is in an off or suspended state comprising a computer subsystem comprising a system CPU, coupled to a bus bridge integrated circuit for coupling said CPU to a plurality of bus systems, and a power supply. Also included is an application launch controller for launching a selected application when the computer subsystem is in an off or suspended state comprising one or more bus interfaces for exchanging commands and data along one or more of said bus systems and for selectively generating a power on command signal to the power supply to deliver power and turn on the computer subsystem and launch the selected application.

In one embodiment, the power supply comprises a system DC/DC converter coupled to the bus bridge and receives an activation or deactivation signal from the bus bridge to power said system CPU based upon the power on command signal, a battery charger circuit and a battery for delivering power through the system DC/DC converter.

In another embodiment, the controller supplies the power on command signal directly to the system DC/DC converter.

In method form, the present invention provides a method to launch a selected application when power to a portable computer device is off or suspended, said method comprising the steps of selecting a desired application to launch; generating a power on signal to a power supply; delivering power to a system CPU and a system bus bridge integrated circuit in response to the power on signal; and launching said selected application.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE PREFERRED EMBODIMENTS

Figure 1:
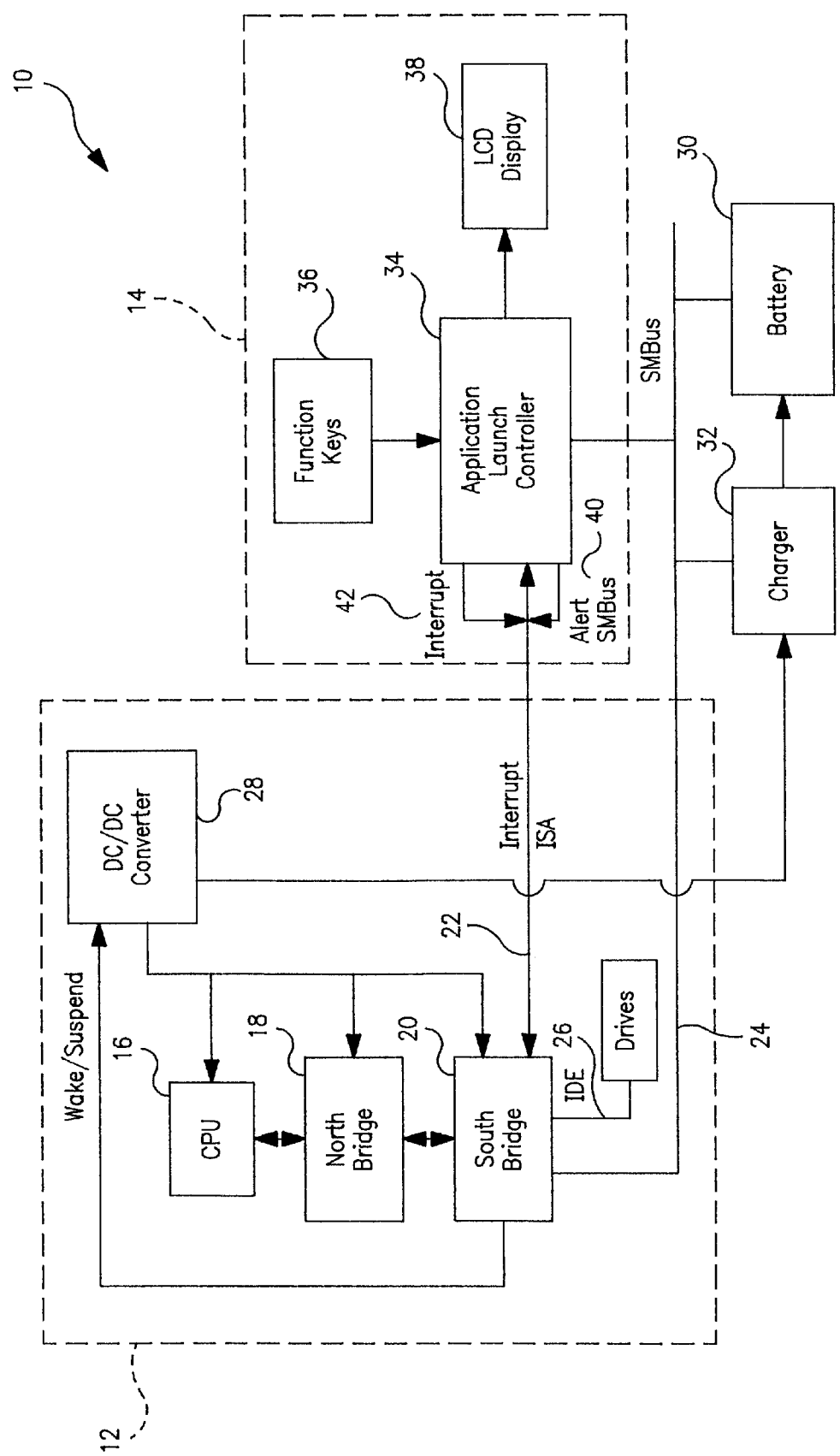
FIG. 1 is a block diagram depiction of a portable computer system modified with an application launch controller of the present invention.

FIG. 1 depicts a system block diagram 10 of a computer subsystem 12 modified with an application controller 14 of the present invention. As an overview, the application controller 14 permits users to launch applications using a set of predefined function keys when power to the computer subsystem 12 is off or in a suspended state. The computer subsystem 12 generally includes all conventional data processing components such as a CPU 16 random access memory (not shown) together with various ICs described in greater detail below. The computer subsystem 12 includes associated input/output busses (e.g., PCI bus, ISA bus, IDE bus and SMBus) for interconnecting various subsystems included within the system 10. CPU 16 interfaces with other subsystems (not shown) through a system controller IC 18, depicted as "north bridge". This is a conventional IC known in the art, and may be implemented, for example, using Intel 822440BX chip set. A bus bridge IC 20 (depicted as "south bridge") interconnects the PCI bus associated with the north bridge 18 with the ISA bus 22, the IDE bus 26, and an SMBus 24. The bus bridge IC 20 may be implemented, for example, Intel 82371EB chip set. The system also includes a system DC/DC converter 28 to couple power from a battery 30 (and associated battery charger circuitry 32) to these various components during normal operation, i.e., the system is on and the operating system (OS) is booted.

The application controller 14 of the present embodiment includes controller 34 operable to transmit an interrupt to the bus bridge 20 along the ISA bus 22 to activate or deactivate the system DC/DC converter 28. Activation and deactivation, as described herein is initiated by, for example, a wake interrupt and a suspend interrupt, respectively generated by the bus bridge IC 20. The interrupt signal could also be communicated along the SMBus.

The application launch controller 34 upon receipt of activation from one or more of the function keys 36, in the present embodiment, generates an alert signal 40 to the SMBus and an interrupt signal 42 to the bus bridge IC 20. The alert signal 40 is generated to activate the battery charger circuit 32 and the battery 30, both of which are coupled to and controlled through the SMBus 24, as is understood in the art. As mentioned above, the interrupt signal 24 is sent to the bus bridge IC 20 to initiate the DC/DC converter. In the preferred embodiment, the function keys 36 comprise one or more dedicated buttons that are activated by the user. Moreover, function keys 36 preferably comprise a programmable set of buttons that are tied to one or more application programs stored within the system. For example, a function key can be programmed so as to launch the user's email program (for example, Microsoft Outlook®).

To conserve battery consumption while still permitting users to obtain the information desired upon pressing a function key, the application launch controller 34 can also include an LCD display 38 displays information related to the task generated by the application, and preferably takes the place of the conventional system display. To that end, application launch controller 34 can be adapted with an interrupt signal that may be sent to the system graphics display port (not shown) via north bridge IC 18 to hold the main display in an off-state for certain application programs. For example, a function key 36 may be preprogrammed to launch the user's email program and application launch controller 34 can be programmed to display the total number of new emails only on the LCD display 38.

Figure 2:
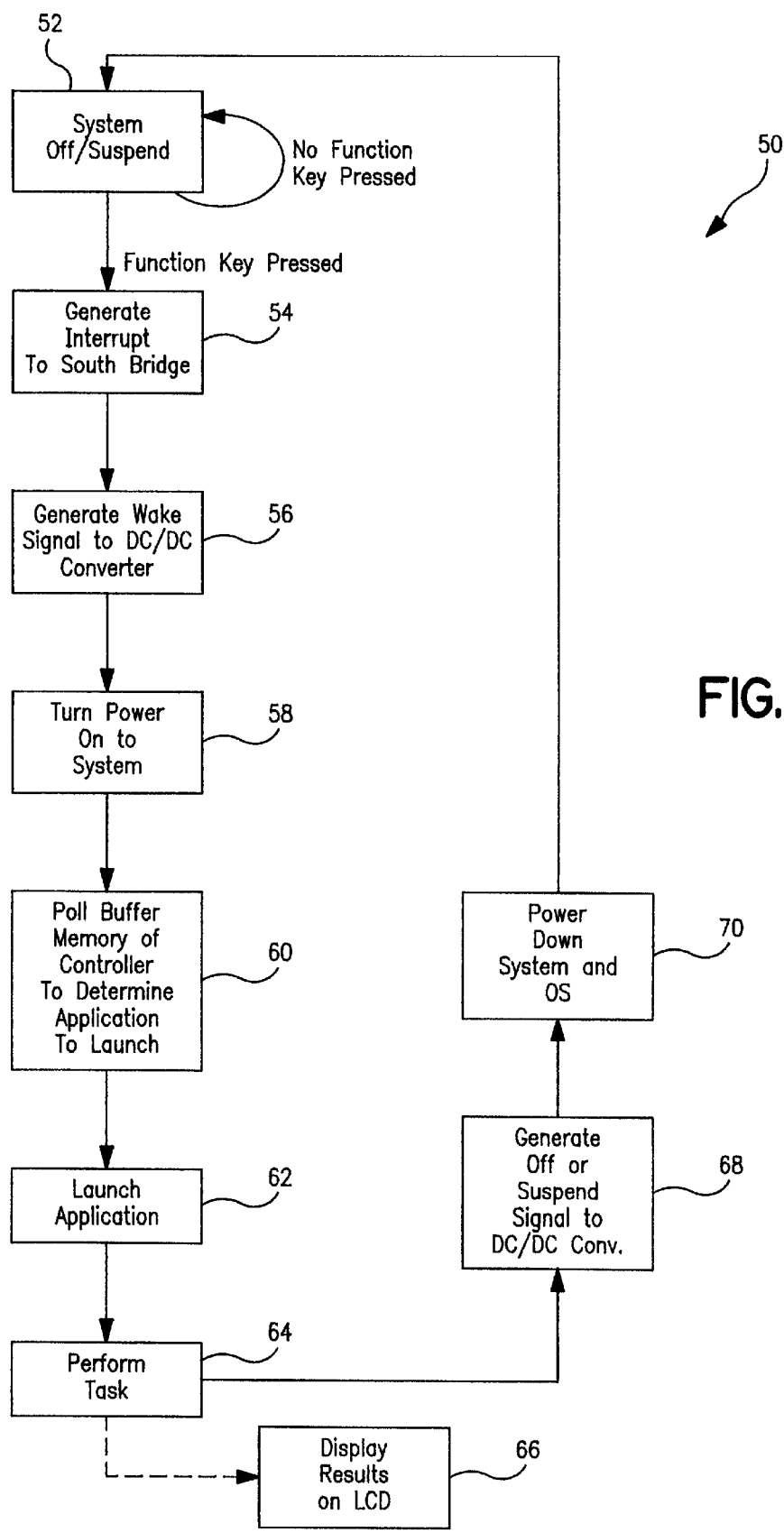
FIG. 2 is a flow chart of the preferred operation of the application launch controller of FIG. 1.

Turning to FIG. 2, a flow chart 50 of the embodiment of FIG. 1 is depicted. If the system is in an off or suspended state 52, and no function key is pressed, the system will remain inactive. If a function key is pressed while the system is in the off or suspended state, an interrupt signal is generated to the south bridge 54. The south bridge, in turn, generates a wake signal or an activate signal to the DC/DC converter 56. Once the system DC/DC converter is activated, the DC/DC converter generates the appropriate commands to the charging circuitry and/or the battery to turn power on to the system 58. The system then boots, as normal. Once booted, the buffer memory of the application launch controller is poled to determine the specific application to launch 60. That application is then launched 62, and further the specific task that may be required by the user is performed 64. As noted above, it may be desirable to not power the system display, but rather display results of the task performed on an LCD 66. After the task has been performed, the application launch controller generates an off or suspend signal to the south bridge IC and to the system DC/DC converter 68. Autonomously, the system and the operating system power down 70 and are placed in the off or suspended state.

Figure 3:
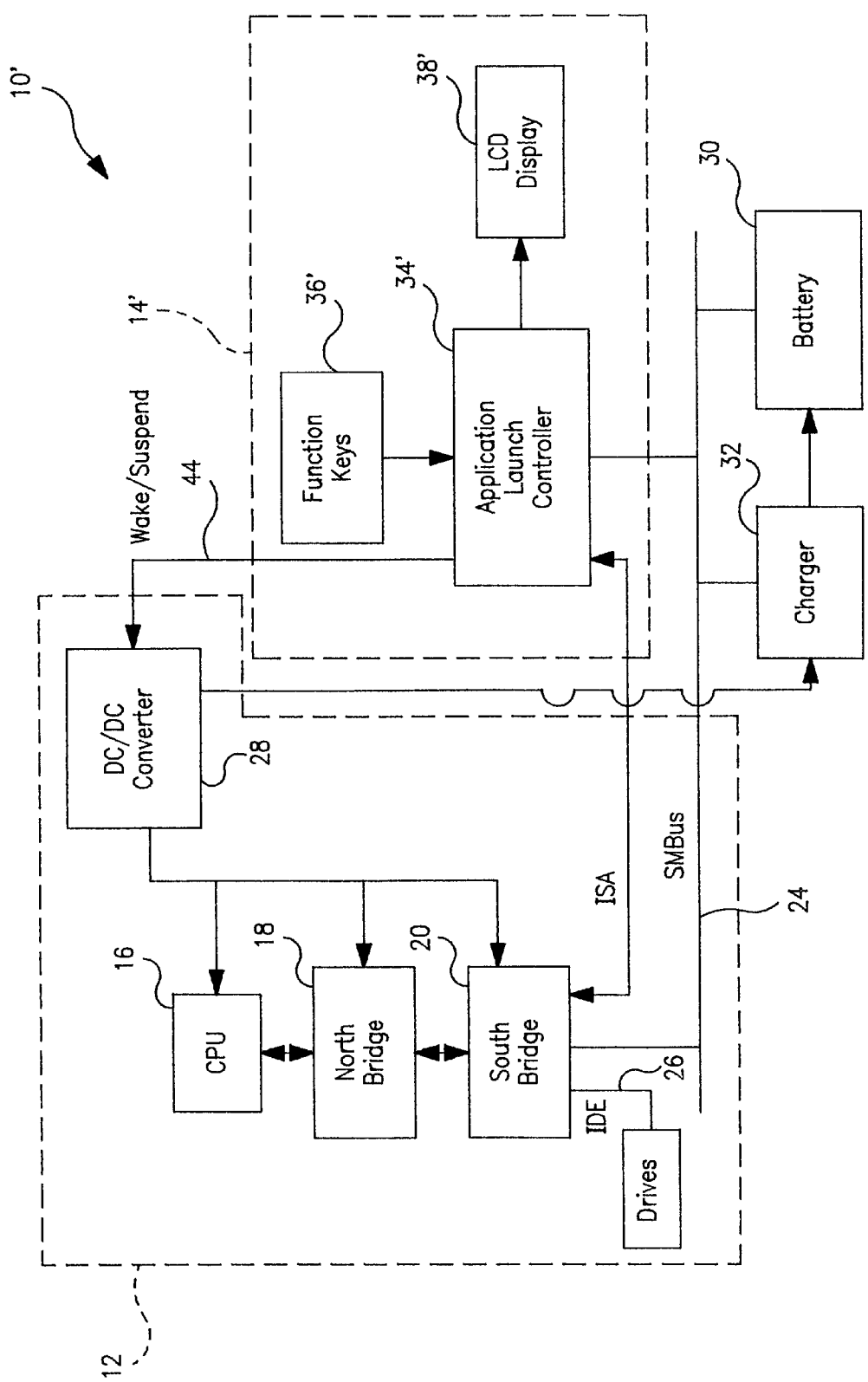
FIG. 3 is a block diagram depicting another embodiment of a portable computer modified with an application launch controller of the present invention.

FIG. 3 depicts a system 10' adapted with an application launch controller 14' of a second embodiment of the present invention. This embodiment differs from the embodiment of FIG. 1 in that instead of generating interrupt signals to and through the south bridge IC 20, the application launch controller 34' of this embodiment generates a control signal 44 directly to the system DC/DC converter 28. In this embodiment, the system DC/DC converter 28 is assumed to be adapt with the ability to externally control its activation using, for example, signal 44 generated by application launch controller 34'. The components of the computer subsystem 12 and application launch controller 14' of this embodiment operate in a manner as described above with reference to FIG. 1.

Figure 4:
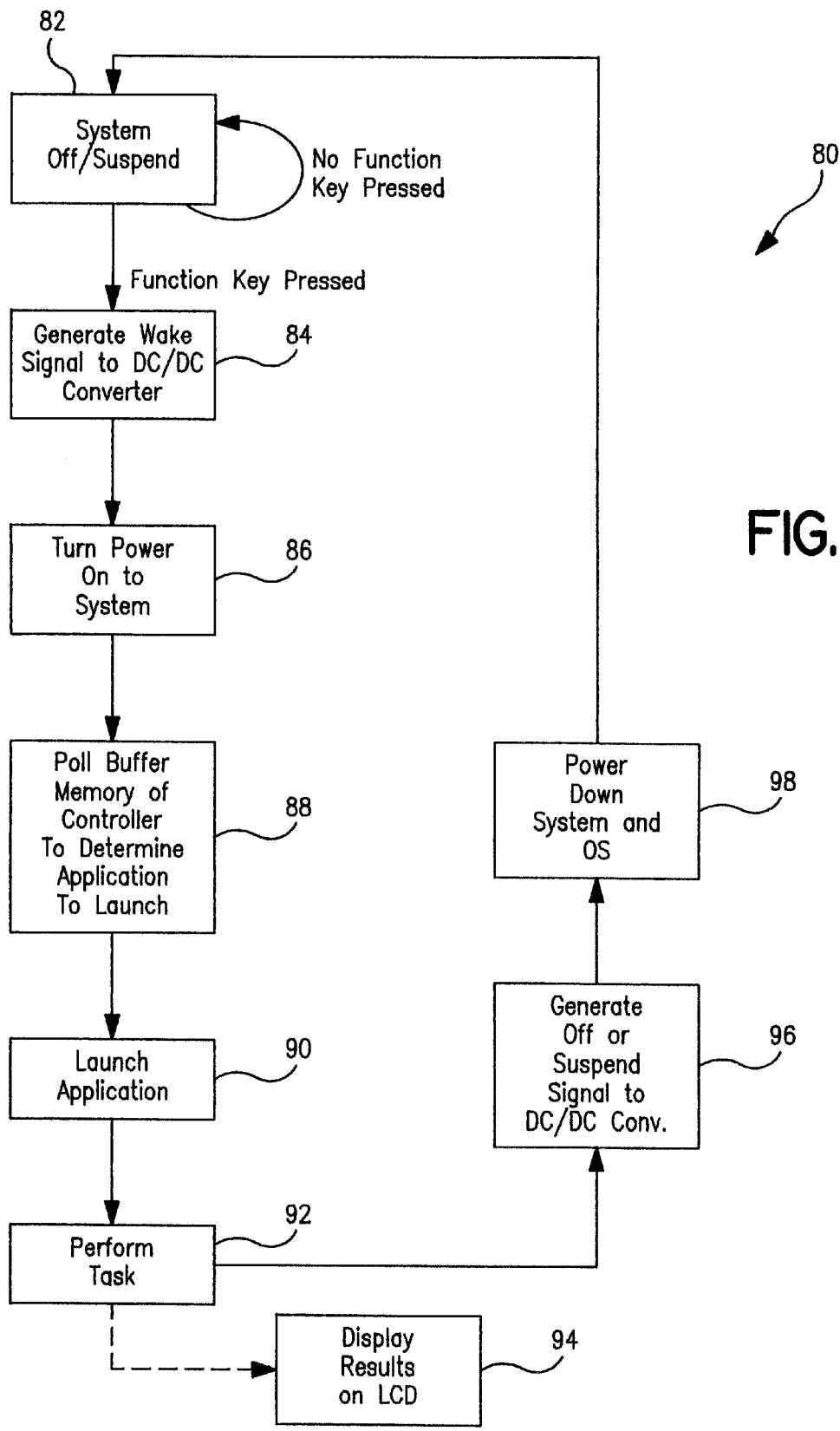
FIG. 4 is a flow chart of the preferred operation of the application launch controller of FIG. 3.

FIG. 4 is a flow chart 80 of the embodiment of FIG. 3. If the system is in an off or suspend state, and no function key is pressed, the system remains in this state 82. Upon activation of a function key, the application launch controller generated a control signal to wake or initiate the system DC/DC converter 84, instead of generating an interrupt signal to the south bridge IC as described in the first embodiment. Activation of the system DC/DC converter in turn activates the battery and/or charger circuitry to turn power on to the system 86. Upon system boot up, the application launch controller polls the buffer memory of the controller to determine which application to launch 88. That application is launch 90 and the specific task required by the user is performed 92. If appropriate, the results of which can be displayed on an LCD 94. Once the task has been performed, the application launch controller generates an off or suspend signal to the system DC/DC converter 96. Accordingly, this operates to power down the system and the operating system 98 and replace the system into an off or suspended state.

In the embodiments of FIGS. 1 and 3, the application launch controller 34 and 34' are appropriately adapted with one or more bus interfaces to exchange commands and data along the system ISA bus 22 and/or SMBus 24. Of course, those skilled in the art will recognize that other bus technologies and may be developed, and the application launch controller may be appropriately adapted with an interface to exchange commands and data along other types of busses.

Thus, it is evident that there has been provided an application launch controller in accordance with the aims and objectives stated herein. Those skilled in the art will recognize numerous adaptations and modifications for the present invention, all of which are deemed within the spirit and scope of the present invention, only as limited by the appended claims.

What is claimed is:

1. A computer system adapted to launch application when the computer system is in an off or suspended state, said computer system comprising:

a computer subsystem comprising a system CPU, coupled to a bus bridge integrated circuit for coupling said CPU to a plurality of bus systems, and a power supply; and an application launch controller for launching a selected application stored on said computer subsystem when said computer subsystem is in an off or suspended state comprising one or more bus interfaces for exchanging commands and data along one or more of said bus systems and for selectively generating a power on command signal to said power supply to deliver power and turn on said computer subsystem and launch said selected application.

2. A computer system as claimed in claim 1, wherein said system power supply comprises a system DC/DC converter coupled to said bus bridge and receiving an activation or deactivation signal from said bus bridge to power said system CPU based upon said power on command signal, a battery charger circuit and a battery for delivering power through said system DC/DC converter.

3. A computer system as claimed in claim 1, wherein said bus systems comprise an ISA bus and an SMBus.

4. A computer system as claimed in claim 1, further comprising user activated function keys generating a command signal to said application launch controller to launch a specified application.

5. A computer system as claimed in claim 1, further comprising an LCD display coupled to said application launch controller for displaying task information related to said selected application.

6. A computer system as claimed in claim 1, wherein said bus systems comprise an ISA bus and an SMBus, and wherein said application launch controller generating an interrupt signal along said ISA bus to said bus bridge integrated circuit and an SMBus alert signal to said SMBus, and said bus bridge integrated circuit generating said power on command to said power supply in response to said interrupt signal from said application launch controller.

7. A computer system as claimed in claim 1, wherein said application launch controller further generating a power off command signal to said power supply system after a task associated with said selected application is completed.

8. A computer system as claimed in claim 1, wherein said application launch controller generating said power on command signal directly to said power supply system.

9. A method to launch a selected application when power to a portable computer device is off or suspended, said method comprising the steps of:

selecting a desired application stored in a portable computer;

generating a power on signal to a power supply;

delivering power to a system CPU and a system bus bridge integrated circuit in response to said power on signal; and launching said selected desired application stored in said portable computer.

10. A method as claimed in claim 9, further comprising the step of generating an interrupt signal to said bus bridge integrated circuit and in response thereto generating a wake signal to said power supply.

11. A method as claimed in claim 9, further comprising the step of displaying information related to said selected application.

12. A method as claimed in claim 9, wherein said step of selecting said application comprises the step of depressing a programmable function key to generate said power on signal.

13. A computer system as claimed in claim 1, wherein said selected application is an email application.

14. A method as claimed in claim 9, wherein said selecting a desired application stored in a portable computer step comprises the step of selecting an email application stored on a hard drive of said portable computer.

* * * * *

UNITED STATES PATENT AND TRADEMARK OFFICE
CERTIFICATE OF CORRECTION

PATENT NO.      : 6,349,386 B1
DATED           : February 19, 2002
INVENTOR(S)     : Reginia Chan et al.

It is certified that error appears in the above-identified patent and that said Letters Patent is hereby corrected as shown below:

<u>Title page,</u>
Item [75], should read as follows: -- Inventor(s): Reginia Chan
                                                                                           Sterling Du --

Signed and Sealed this

Twelfth Day of November, 2002

Attest:

JAMES E. ROGAN
Attesting Officer                       Director of the United States Patent and Trademark Office